United States Patent

Lamphere et al.

[15] 3,635,084

[45] Jan. 18, 1972

[54] MASS FUEL FLOW MEASUREMENT SYSTEM

[72] Inventors: David A. Lamphere, Chittenden; Douglas E. Stuart, Middlebury, both of Vt.

[73] Assignee: Simmonds Precision Products, Inc., Tarrytown, N.Y.

[22] Filed: Aug. 28, 1969

[21] Appl. No.: 853,757

[52] U.S. Cl. .........................................73/231 M, 73/194 M
[51] Int. Cl. .....................................................F16g 1/00
[58] Field of Search ..........................73/194 M, 231, 231 M

[56] References Cited

UNITED STATES PATENTS

| 2,617,299 | 11/1952 | Ennis et al. | 73/194 |
| 3,066,529 | 12/1962 | Warren | 73/194 |
| 3,176,222 | 3/1965 | Atkisson | 73/194 UX |
| 3,302,446 | 2/1967 | Schmitt et al. | 73/194 |
| 3,315,524 | 4/1967 | Duffy et al. | 73/231 |
| 3,385,108 | 5/1968 | Rosso | 73/194 |

FOREIGN PATENTS OR APPLICATIONS

| 830,449 | 3/1960 | Great Britain | 73/194 |

Primary Examiner—Richard C. Queisser
Assistant Examiner—John Whalen
Attorney—Edwin E. Greigg

[57] ABSTRACT

The system measures the mass flow rate of a liquid. It comprises a turbine impeller located in the flow stream which rotates at a rate proportional to the volume flow rate of the liquid and produces a corresponding electrical signal. This electrical signal is electrically multiplied with a further signal proportional to the liquid density so as to give the required liquid mass flow rate. The density signal is obtained from a capacitive sensor positioned in the liquid whereby the liquid constitutes the dielectric of the capacitor so that the capacitance of the sensor varies with density.

6 Claims, 2 Drawing Figures

PATENTED JAN 18 1972

INVENTORS
David A. Lamphere & Douglas
E. Stuart
BY
Edwin E. Greigg
ATTORNEY

INVENTORS
David A. Lamphere & Douglas E. Stuart
BY
ATTORNEY

MASS FUEL FLOW MEASUREMENT SYSTEM

BRIEF SUMMARY OF THE INVENTION

The invention relates to systems for measuring the mass flow rate of a fluid and more specifically, but not exclusively, the mass flow rate of liquid fuel.

According to the invention there is provided a fluid flow measurement system comprising rotatable means mounted in the fluid flow to rotate at a rate dependent on the volume flow rate thereof, transducer means responsive to rotation of the rotatable means to produce a first electrical signal proportional to the rate of rotation thereof, capacitor means responsive to the density of the fluid to produce a second electrical signal dependent on the density of the fluid, combining means connected to receive the first and second electrical signals and operative to combine them to produce an electrical output signal representing the mass rate of flow of the fluid, and indicating means connected to receive the output signal and operative to produce an indication of the value thereof.

BRIEF DESCRIPTION OF THE DRAWINGS

A system embodying the invention for measuring the mass flow rate of liquid fuel in an aircraft fuel system will now be described, by way of example only, with reference to the accompanying drawings in which.

DETAILED DESCRIPTION

SENSOR

Figure 1:
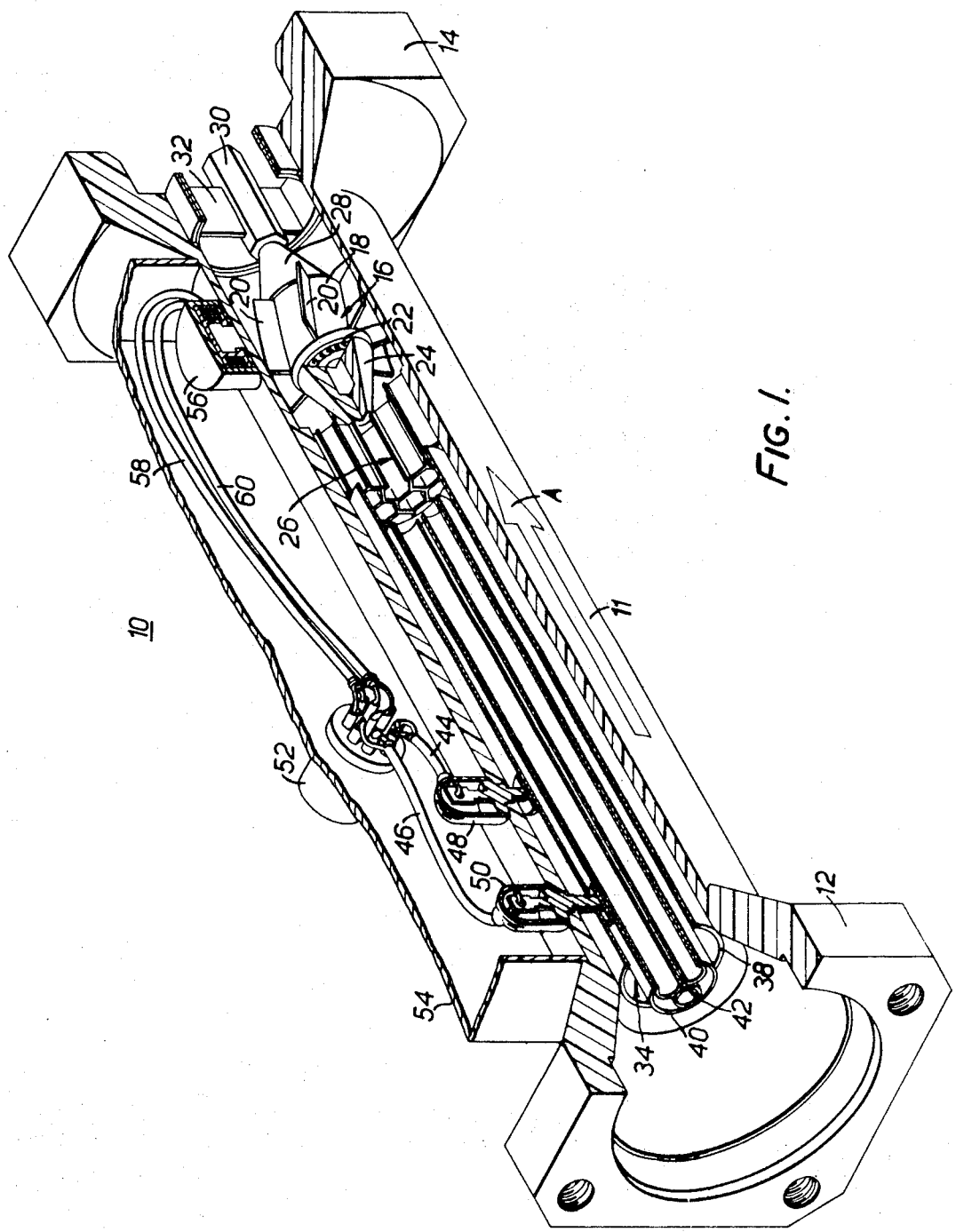
FIG. 1 is a perspective view, partially cut away, of sensor apparatus used in this system.

As shown in FIG. 1, the sensor 10 used in the system comprises a hollow tubular housing 11 made of electrically insulating material and having flanges 12 and 14 at each of its opposite ends by means of which the sensor can be coupled into, and in series with, a pipe through which is flowing the fuel whose mass flow rate is to be measured.

At its downstream end, the tubular housing 11 has a turbine impeller 16. The turbine 16 comprises a body 18 to which is attached a plurality of turbine blades 20 made of magnetic material. The body 18 is rotatably supported in upstream and downstream ball bearing assemblies of which only the upstream assembly, 22, is visible. The ball bearing assemblies are carried on a stationary shaft not visible, which extends axially through the body 18 and is supported at one end by a stationary flow guide member 24, which is attached to a rigid lattice 26 of hexagonal tubes fixed to the inner surface of the tubular housing 11, and at the other end by a fixed conical member 28 attached to a further fuel guide 30, the latter being supported in the tubular housing 11 by a fixed blade 32. The turbine 16 is thus free to rotate within the tubular housing 11 about an axis extending therealong.

Also enclosed within the tubular housing 11, and upstream of the turbine assembly 16, is a capacitor assembly 34. The capacitor assembly 34 comprises two tubular and concentric capacitor plates 38 and 40. The two capacitor plates are spaced from each other by means not shown but which may comprise blocks of suitable electrically insulating material such as TEFLON (trademark). Inside the inner capacitor plate 40 is arranged an assembly 42 of three tubular fuel guides. Electrical connections are made to capacitor plates 38, 40 by means of coaxial cables 44 and 46 which lead through hollow glass connectors 48 and 50. Cable 44 connects to the outer capacitor plate 38 and cable 46 connects to the inner capacitor plate 40. Cables 44 and 46 connect to terminals of a socket 52 which is supported in the side of an enclosure box 54 (partially cut away in FIG. 1) attached to the top of the housing 11.

Also mounted in the box 54 is an electrical coil 56 which is mounted on the tubular housing 11 adjacent the turbine 16. Connections from the two ends of the coil 56 are made to the plug 52 by means of two coaxial cables 58 and 60.

In operation, the fuel flows through the tubular housing 11 in the direction of the arrow A. The fuel flows along the tubes of the assembly 42 and also between the inner and outer capacitor plates 38 and 40, and thence through the lattice 26 and past the turbine 16. The fuel constitutes the dielectric of the capacitor formed by the plates 38 and 40; hence the capacitance of this capacitor varies according to the density of the fuel. In addition, the passage of fuel past the turbine 16 rotates the latter at a speed proportional to the volume rate of flow. The blades of the turbine assembly 16 cause the reluctance of coil 56 to be varied at a rate proportional to the volume rate of flow of the fuel.

It will therefore be seen that the sensor 10 produces two electrical signals; one, derived from the capacitor formed by the plates 38 and 40, is indicative of the density of the fuel, and the other, derived from the turbine assembly 16 and the coil 56, is dependent on the volume rate of flow of the fuel. These signals are used in the circuit of FIG. 2, which is now to be described, to produce an indication of the mass flow rate of the fuel.

The sensor 10 may be modified by incorporating magnetized material in the blades of the turbine impeller 16 so as to induce current pulses in the coil 56 at a rate proportional to the rotational speed of the impeller. This arrangement may not, however, be so advantageous as the arrangement described above because the magnetized blades may cause magnetic drag on the impeller.

ELECTRICAL CIRCUITRY - TRANSMITTER SECTION

Figure 2:
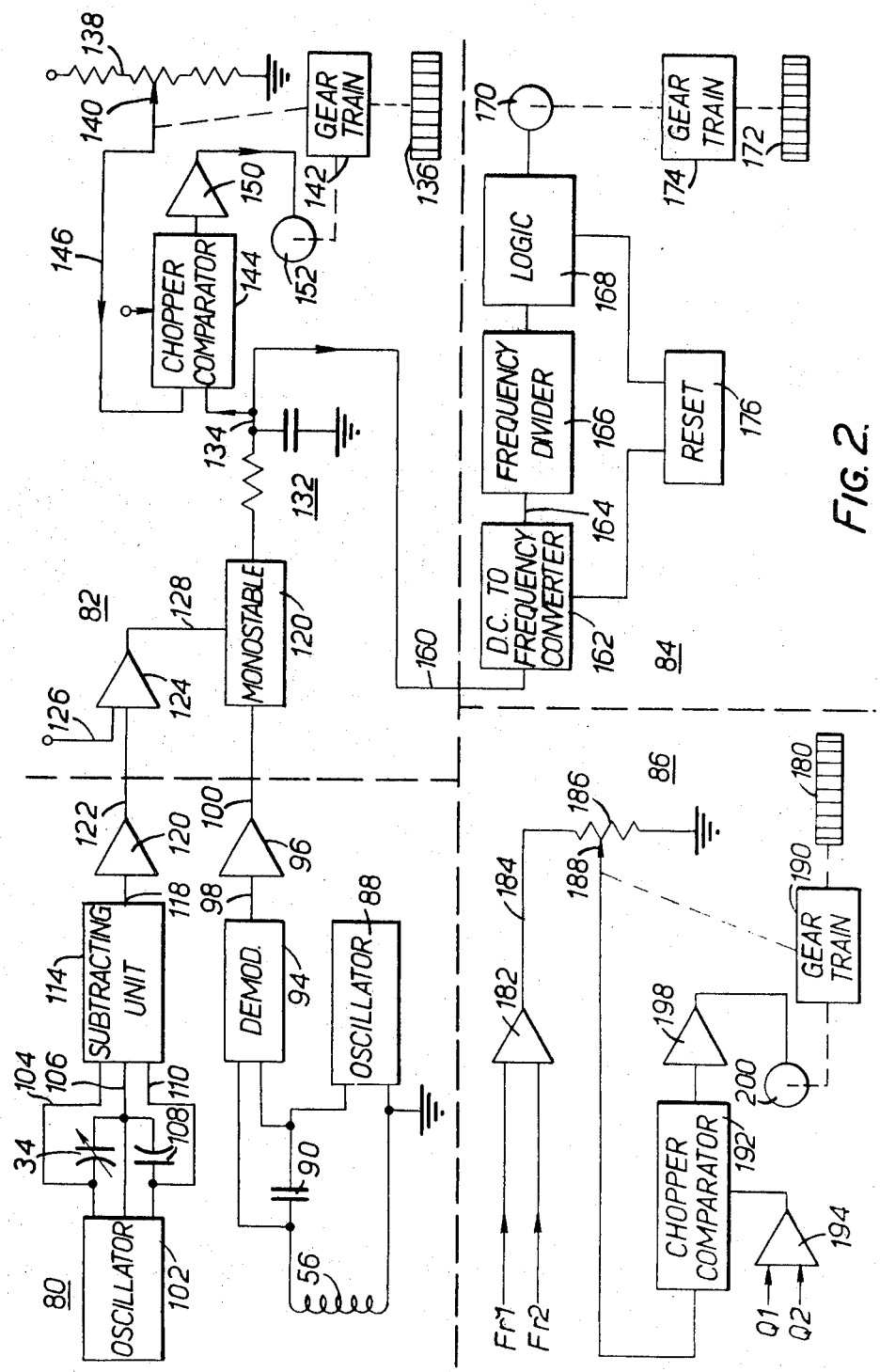
FIG. 2 is a schematic circuit diagram of the system

The circuit of FIG. 2 comprises four sections; a transmitter section 80, a flow rate section 82, a fuel-consumed section 84, and a time-remaining section 86.

The transmitter section 80 comprises the sensor 10 of FIG. 1 together with associated electrical circuitry. The associated electrical circuitry may be mounted closely adjacent to the sensor 10 or in the box 54 thereof (though not so shown in FIG. 1). The associated electrical circuitry comprises a 45 kHz. oscillator 88 which is energized from a standard power supply not shown and which is connected across the coil 56 of the sensor by means of connections made through the socket 52 (see FIG. 1); a capacitor 90 is connected in series with the coil 56 for tuning purposes, and one side of the coil is grounded. As the turbine impeller 16 rotates in response to the fuel flow, the reluctance of the coil 56 varies in the manner explained and thus alters the impedance of the coil thereby modulating the 45 kHz. signal applied across the coil. The modulated signal, shown diagrammatically at 92, is tapped off across capacitor 90 and fed to a conventional demodulator unit 94 which removes the 45 kHz. carrier. The demodulated signal, which is an alternating voltage having a frequency proportional to the rate of rotation of the turbine assembly 16, is fed to an amplifier and shaper 96 by means of a line 98. The amplifier and shaper 96 produces a fixed amplitude square wave output on the line 100 which has a frequency proportional to the rate of rotation of the turbine assembly 16 and thus proportional to the volume rate of flow of the fuel (Fv).

The transmitter section 80 also comprises a 16 kHz. oscillator 102, which is fed from a standard power supply not shown. The output from the oscillator 102 is connected, through the socket 52, to energize the capacitor 34 formed by the plates 38 and 40 in the sensor 10. Therefore, lines 104 and 106 carry a signal which is dependent on the density of the fuel. The oscillator 102 also energizes a fixed capacitor 108 whose capacitance value is that which would be produced by capacitor 34 when fuel of the minimum density likely to be used in the system is passing through the sensor 10. Lines 106 and 110 therefore produce a signal dependent on this minimum density. A subtracting unit 114 subtracts the signal on line 110 from that on line 104 so as to produce a signal on a line 118 which is dependent on the amount by which the fuel density exceeds the predetermined minimum density. This signal is amplified in an amplifier 120 and fed to the flow rate indicator section 82 on a line 122.

ELECTRICAL CIRCUITRY—FLOW RATE SECTION

The flow rate section 82 comprises a summing amplifier 124 which receives the signal on the line 122, representing the amount by which the fuel density exceeds the predetermined minimum density, and which also receives a reference signal on a line 126 representing this predetermined minimum density. The output from amplifier 124 on a line 128 is therefore proportional to the total density D of the fuel, and this signal controls a monostable circuit 130 such that the amplitude of the latter's output pulses is proportional to the amplitude of the signal on the line 128. Each pulse from the monostable circuit 130 has a constant width, and the monostable circuit is connected to be triggered by each square wave pulse received on line 100. Therefore, the output of the monostable circuit 130 comprises a series of constant-width pulses having a frequency which is proportional to volume flow rate $Fv$ and an amplitude which is proportional to total fuel density D. The area under each pulse of the output from the monostable circuit 130 is therefore proportional to $Fv \times D$ and hence is proportional to the mass flow rate $Fm$ of the fuel. The output from the monostable circuit 130 is fed to a filter unit 132 which produces a DC level proportional to the mean value of the monostable output, this mean value being proportional to the average area of the pulses in the monostable output and thus proportional to $Fm$. This DC signal is fed on a line 134 to a self-balancing potentiometer unit for driving a mass flow rate indicator 136. The latter is diagrammatically indicated as being a mechanical digital indicator but may take any other suitable form.

The self-balancing potentiometer unit comprises a potential divider network 138 which is fed with a stabilized DC voltage from a standard power supply not shown, and has a movable tapping 140. The tapping 140 is mechanically linked, through a gear train 142, to the digital indicator 136 so that the position of the tapping 140 on the potential divider 138 is proportional to the indication of the indicator 136. The electrical potential of the tapping 140 is supplied to a chopper comparator unit 144 by means of a line 146.

The chopper comparator unit 144 also receives the DC signal on the line 134 proportional to $Fm$.

The chopper comparator 144 is driven at 400 Hz. from a standard power supply not shown, and compares the DC values of the two signals received on lines 134 and 144 to produce a signal on a line 148 having a frequency of 400 Hz. and an amplitude proportional to the error, if any, between the two signals compared. This error signal represents the difference between the actual indication of the digital indicator 136 and the actual measured value of the mass flow as represented by the signal on line 134. The error signal is amplified in a servoamplifier 150 and applied to a servomotor 152. The motor is linked to the tapping 140 through the gear train 142, and drives the tapping to a position which the error signal falls to zero. This position, which is indicated on the indicator 136, represents the mass flow rate of the fuel passing through the sensor 10.

It will be noted that the capacitor 34 and 108 combine to produce a signal proportional to the difference between the actual fuel density and the predetermined minimum density, this signal being added in the summing amplifier 124 to the reference signal representing the predetermined minimum density so as to produce the output signal proportional to the total density of the fuel. This arrangement is advantageous in that failure of the signal on the line 122 for any reason does not render the entire system inoperative; the system still provides a useful indication of the fuel flow but this is now related to the predetermined minimum fuel density instead of the actual fuel density. This arrangement is also advantageous in that the total density signal produced on line 128 is, at the most, only about 20 percent dependent on the correction signal produced on line 122. The signal on line 126, which provides the remainder of the total density signal, can be controlled much more accurately than the signal on line 122 thus improving the overall accuracy of the system.

ELECTRICAL CIRCUITRY—FUEL-CONSUMED SECTION

The signal on line 134 representing the mass flow rate of the fuel is also passed to the fuel-consumed section 84 on a line 160. Here, it operates a DC-to-frequency converter 162 which produces an output signal on a line 164 having a fixed amplitude and a frequency proportional to the DC signal on line 160. This alternating signal is passed into a frequency divider 166 which divides the frequency by a fixed factor, and then, through logic 168, drives a stepping motor 170. The motor 170 performs one angular rotational step for each pulse output from the logic 168, and each rotational step of motor 170 therefore represents a predetermined mass unit of fuel consumed. The motor drives a digital indicator 172 through a gear train 174, and the indication of the indicator 173 thus represents the total mass of fuel consumed.

Reset circuitry 176 is provided for resetting the DC-to-frequency converter 162 and the motor logic 168.

The use of a stepping-type motor to drive the counter 172 is advantageous in that it provides a mechanical memory in the event of power failure.

ELECTRICAL CIRCUITRY—TIME-REMAINING SECTION

The time-remaining section 86 comprises a digital indicator 180 calibrated in time units, which is driven, in a manner to be described, so as to provide a continuous indication of the amount of time remaining before the aircraft's fuel supply is completely used. The operation of the section 86 is governed by the following equations which assume, for the purposes of example, a twin-engined aircraft having two fuel tanks:

$$Tr = \frac{Q1+Q2}{Fr1+Fr2} \qquad (1)$$

Thus, $$(Q1+Q2)-(Fr1+Fr2) \cdot Tr = 0 \qquad (2)$$

where $Tr$ is the time remaining, $Q1$ and $Q2$ are the initial fuel quantities in the two fuel tanks, and $Fr1$ and $Fr2$ are the respective instantaneous flow rates of fuel to the two engines. The quantities $Q1$, $Q2$, $Fr1$ and $Fr2$ may be expressed either in volume or mass terms (provided all are expressed in the same terms).

The section 86 comprises a summing amplifier 182 which receives and sums two signals respectively representing $Fr1$ $Fr2$. The signal $Fr1$ is obtained from the flow rate indicator section 82 and is the signal produced on the line 100 or that produced on the line 134 according as to whether the section 86 is utilizing mass or volume terms. The signal $Fr2$ is obtained from the corresponding point in the flow rate indicator section of the fuel flow measuring system of the second engine.

The summing amplifier produces an amplified output signal on a line 184 which is proportional to $(Fr1+Fr2)$, and this signal is applied across a potential divider element 186 having a movable tapping 188. The tapping 188 is mechanically linked, through a gear train 190, to the digital indicator 180 so that the position of the tapping is proportional to the indication of the indicator 180.

The electrical potential of the tapping 188, which is $A(Fr1+Fr2)$ where $A$ is the distance of the tapping from one end of the element 186, is applied to one input of a chopper comparator 192. The other input of the chopper comparator is energize from the output of a summing amplifier 194 which receives two electrical signals respectively representing the terms $Q1$ and $Q2$. The comparator 192 is energized by a 400 Hz. signal from a standard power supply and produces a 400 Hz. output on a line 196. This signal represents the difference between $A(Fr1+Fr2)$ and $(Q1+Q2)$ and drives a servoamplifier 198 energizing a servomotor 200. The latter is connected to the gear train 190 and repositions the tapping 188 until the error signal produced by the comparator 192 is zero, and adjusts the setting of the indicator 180 correspondingly. When the error signal produced by the comparator 192 is zero, $$(Q1+2)-(Fr1+Fr2)\cdot A=0.$$

Therefore, it follows from equation (2) above that $A=Tr$, and hence the indication of the indicator 180 represents the time remaining.

Although but one embodiment of the invention has been described, it will be appreciated that this embodiment is to be considered as illustrative and not restrictive, and that many changes and modifications can be made to the embodiment described by those skilled in the art without departing from the spirit and scope as defined in the appended claims.

What is claimed is:

1. A fluid flow measurement system comprising the combination of rotatable means mounted in the fluid flow to rotate at a rate dependent on the volume flow rate thereof, wall means defining a passage through which the fluid flows, and a bladed impeller rotatably mounted in the passage so as to be rotated by the flow of fluid therepast, transducer means responsive to rotation of the rotatable means to produce a first electrical signal proportional to the rate of rotation thereof, coil means fixedly mounted on the wall means adjacent the impeller, and means energizing the coil means with a high-frequency electrical signal, the bladed impeller incorporating magnetic material which varies the impedance of the coil means as the impeller rotates so as to modulate the high-frequency carrier, capacitor means responsive to the density of the fluid to produce a second electrical signal dependent on the density of the fluid said capacitor including a pair of capacitor plates defining a passage through which the fluid flows so as to vary the dielectric between the capacitor plates, and an electrical source energizing the capacitor plates and operative to produce an electrical voltage signal dependent on the capacitance between the plates, fixed capacitor means arranged to be energized by the energizing source and having a capacitance such as to produce an electrical voltage signal representing a predetermined minimum fluid density, subtracting means connected to receive the two said electrical voltage signals and to subtract one from the other so as to produce an intermediate signal representing the amount by which the fluid density exceeds the predetermined minimum density, adding means connected to add the intermediate signal to a reference signal representing the predetermined minimum fluid density whereby to produce the said second electrical signal, a triggerable monostable circuit producing a constant-width output pulse when triggered, triggering means responsive to the first electric signal and operative to repeatedly trigger the monostable circuit in synchronism therewith, amplitude control means responsive to the second electrical signal and operative to control the amplitude of the output pulses of the monostable circuit in dependence on the amplitude of the second control signal, and means responsive to the monostable circuit and operative to produce, as the said output signal, a signal representing the average area under the output pulses of the monostable circuit.

2. The system of claim 1, wherein filtering means are used to filter the pulse from the monostable circuit so as to produce, as the electrical output signal, a DC signal representing the mean value of the output pulses from the monostable circuit.

3. The system of claim 2, wherein indicating means are connected to receive the output signal and operative to produce an indication of the value thereof, said indicating means including a mechanical indicator, and a self-balancing servomechanism responsive to the electrical output signal and operative to set the mechanical indicator in dependence thereon.

4. The system of claim 3, wherein integrating means are connected to receive and integrate the said electrical output signal, and a fuel-consumed indicator controlled in dependence on the value of the integrated electrical output signal.

5. The system of claim 4, wherein means are used to compare the fluid flow rate with a predetermined initial quantity of the fluid so as to produce a signal representing the time remaining for the said quantity to be exhausted.

6. The system of claim 5, further including a potential divider element, means applying a potential difference across the potential divider element proportional to the instantaneous flow rate of the fluid, an electrical tapping movable along said element, comparing means operative to compare the potential of said tapping with a reference signal representing said quantity so as to produce an error signal dependent on the difference, if any, between the two signals compared, servomechanism connected to be energized by the error signal and operative to move the tapping along the element until the error signal is zero, and a time-remaining indicator connected to produce an indication in dependence of the position of the tapping.

* * * * *